(12) United States Patent
Maleki et al.

(10) Patent No.: US 6,473,218 B1
(45) Date of Patent: Oct. 29, 2002

(54) LIGHT MODULATION IN WHISPERING-GALLERY-MODE RESONATORS

(75) Inventors: Lute Maleki, Pasadena, CA (US); Anthony F. J. Levi, South Pasadena, CA (US); Steve Yao, Diamond Bar, CA (US); Vladimir Ilchenko, La Canada, CA (US)

(73) Assignee: California Institute of Technology, Pasadena, CA (US)

( * ) Notice: Subject to any disclaimer, the term of this patent is extended or adjusted under 35 U.S.C. 154(b) by 27 days.

(21) Appl. No.: 09/591,866

(22) Filed: Jun. 12, 2000

Related U.S. Application Data

(60) Provisional application No. 60/138,942, filed on Jun. 11, 1999.

(51) Int. Cl.[7] .............................. G02F 1/03; G02F 1/07; G02F 1/035
(52) U.S. Cl. ............................................ 359/245; 385/3
(58) Field of Search ................................ 359/245, 237, 359/248, 254, 260; 385/1, 2, 3, 8, 131, 15, 16, 17, 18

(56) References Cited

U.S. PATENT DOCUMENTS 5,581,642 A * 12/1996 Deacon et al. ................ 385/15
6,009,115 A * 12/1999 Ho ................................ 372/92

FOREIGN PATENT DOCUMENTS

EP      0 533 390 A1 *   3/1993
WO    WO 00/35057     *   6/2000

OTHER PUBLICATIONS

L. Collot, et al., Very High–Q Whispering–Gallery Mode Resonances Observed on Fused Silica Microspheres, Europhys. Lett., 23(5), pp. 327–334, 1993.

H. Lin et al., cw Nonlinear Optics in Droplet Microcavities Displaying Enhanced Gain, Physical Review Letters, vol. 73, No. 18, Oct. 31, 1994.

V. Braginsky et al., Quality–Factor and Nonlinear Properties of Optical Whispering–Gallery Modes, Physics Letters A, vol. 137, No. 7,8, May 29, 1989.

V. Ilchenko, et al., Pigtailing the high–Q microsphere cavity: a simple fiber coupler for opticalwhispering–gallery modes, Optics Letters, vol. 24, No. 11, Jun. 1, 1999.

* cited by examiner

Primary Examiner—Jordan Schwartz
Assistant Examiner—William Choi
(74) Attorney, Agent, or Firm—Fish & Richardson P.C.

(57) ABSTRACT

Techniques and devices to modulate light by using a whispering gallery mode optical resonator exhibiting an electro-optic effect. An electrical signal is coupled into the optical resonator to change a dielectric constant of optical resonator and thus to modulate the optical output from the optical resonator.

28 Claims, 4 Drawing Sheets

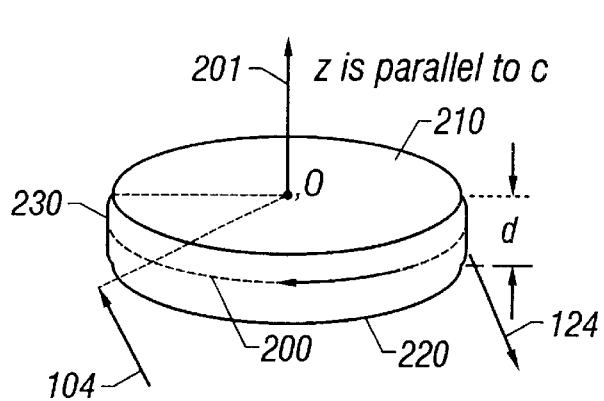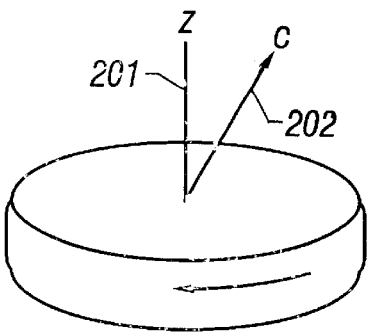
FIG. 2A  FIG. 2B
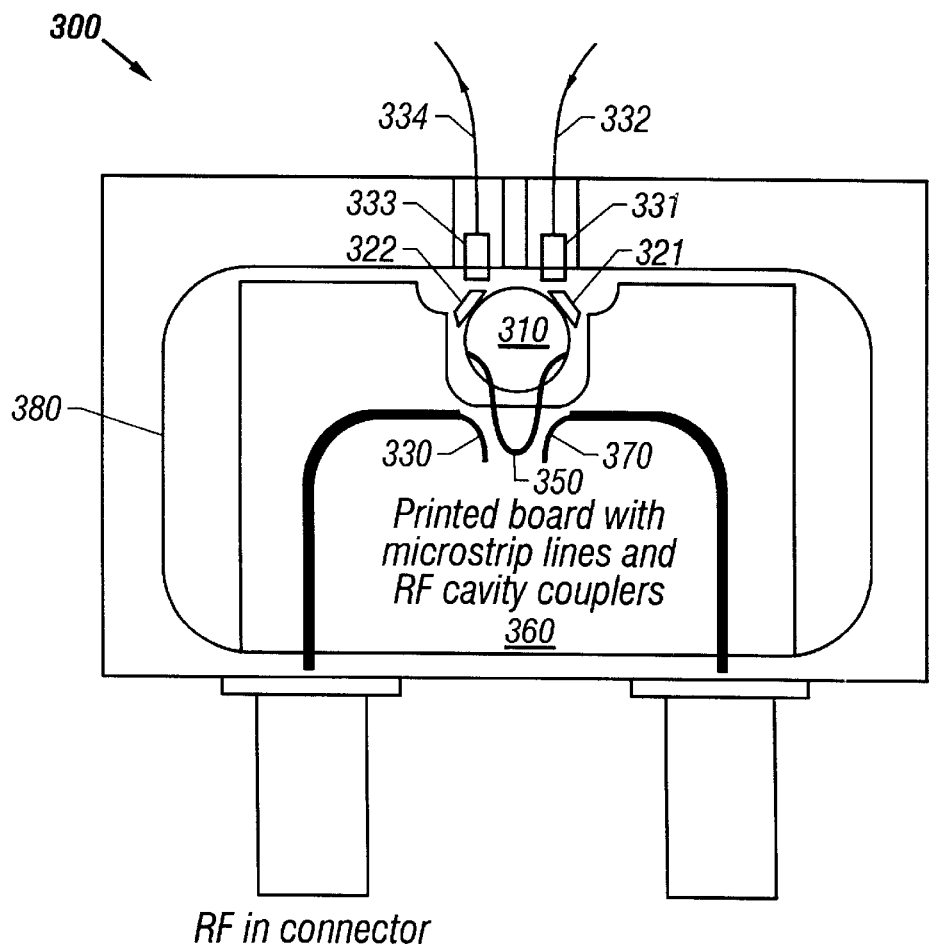
FIG. 3

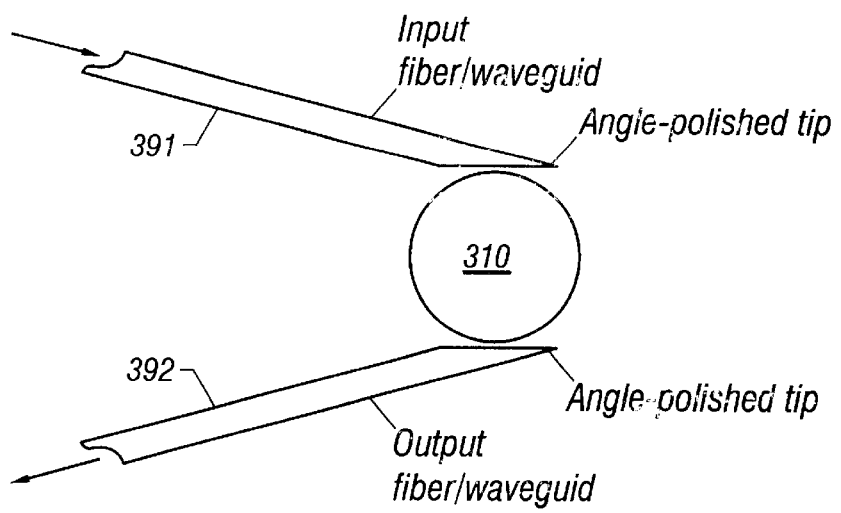
FIG. 3A
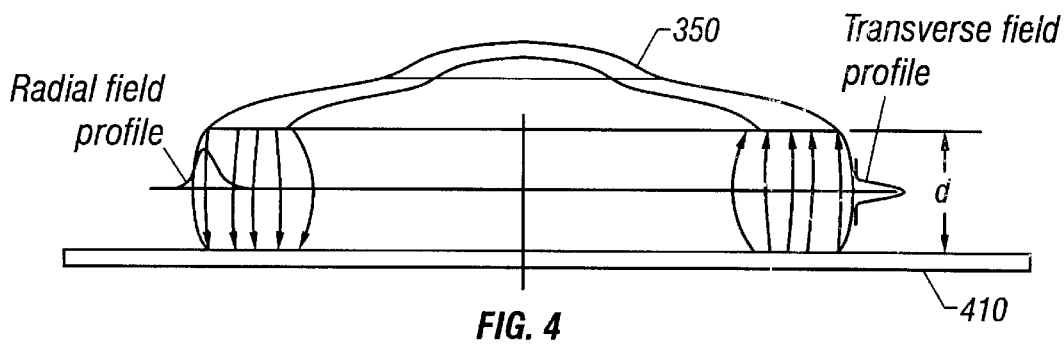
FIG. 4
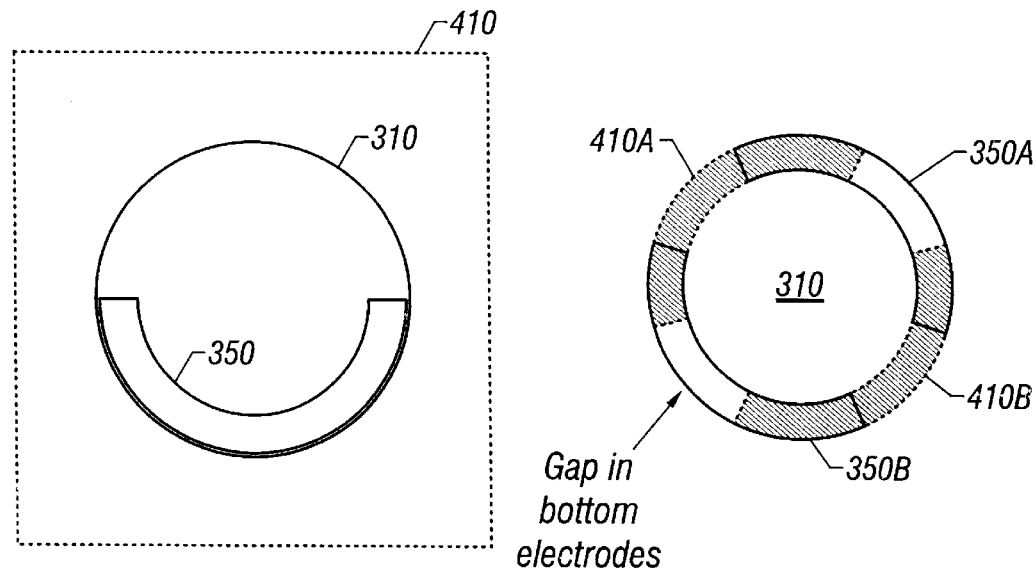
FIG. 5　　　FIG. 6

LIGHT MODULATION IN WHISPERING-GALLERY-MODE RESONATORS

This application claims the benefit of U.S. Provisional Application No. 60/138,942 filed on Jun. 11, 1999.

ORIGIN OF THE DISCLOSURE

The systems and techniques described herein were made in the performance of work under a NASA contract, and are subject to the provisions of Public Law 96-517 (35 USC 202) in which the Contractor has elected to retain title.

BACKGROUND

This application relates to modulation of optical signals, and more specifically, to methods and devices for modulating an optical signal by using electro-optical modulators.

Optical communication systems use one or more optical carrier waves to provide high-speed and wide bandwidth signal transmission. An optical carrier wave can be transmitted either through the free space or in an optical waveguiding channel such as a fiber link. The data capacity of a fiber link can be increased by using a wavelength-division multiplexing technique which simultaneously transmits optical carriers of different wavelengths over the same fiber so that different channels of data can be sent at the same time. Many other non-optical communication systems, such as wired networks, radio wireless networks, satellite communication systems, can be combined with optical systems to meet various communication needs and requirements.

An optical communication system may include a light source such as a laser to produce the optical carrier wave, an optical modulator to modulate the optical carrier wave to carry information, and an optical receiver which may include a photodetector to convert the optical information into a desired electronic format for further processing. The optical modulator may modulate either the phase or amplitude of the optical carrier wave. It is desirable to obtain high energy efficiency and a high modulation speed in an optical modulator for optical communication and other applications.

SUMMARY

The present techniques and devices for optical modulation include an electro-optic light modulators formed from gallery-whispering-mode resonators. One embodiment of such a modulator includes a gallery-whispering-mode resonator formed of an electro-optical material, a first optical coupler to couple an input laser beam into the resonator, a second optical coupler to couple the optical energy out of the resonator to produce an optical output, and an electrical coupler to apply a driving electrical signal. The optical energy from the input laser beam is coupled to into the resonator in one of the whispering gallery modes. The applied electrical signal modulates the dielectric constant of the resonator and hence the mode of the whispering gallery modes. This modulates the intensity of the output from the second optical coupler.

One configuration of various forms of the gallery-whispering-mode resonator may be a disk-like resonator formed around an equator of a sphere.

BRIEF DESCRIPTION OF THE DRAWINGS

FIGS. 2A and 2B show a disk resonator fabricated from a sphere with two different orientations of the optic axis of the electro-optical crystal.

FIG. 3 shows one implementation of the device shown in FIG. 1.

FIG. 3A shows optical coupling by angle-polished waveguide or fiber.

FIGS. 4, 5, and 6 show examples of RF electrodes for a disk-like whispering-gallery-mode resonator.

DETAILED DESCRIPTION

Figure 1:
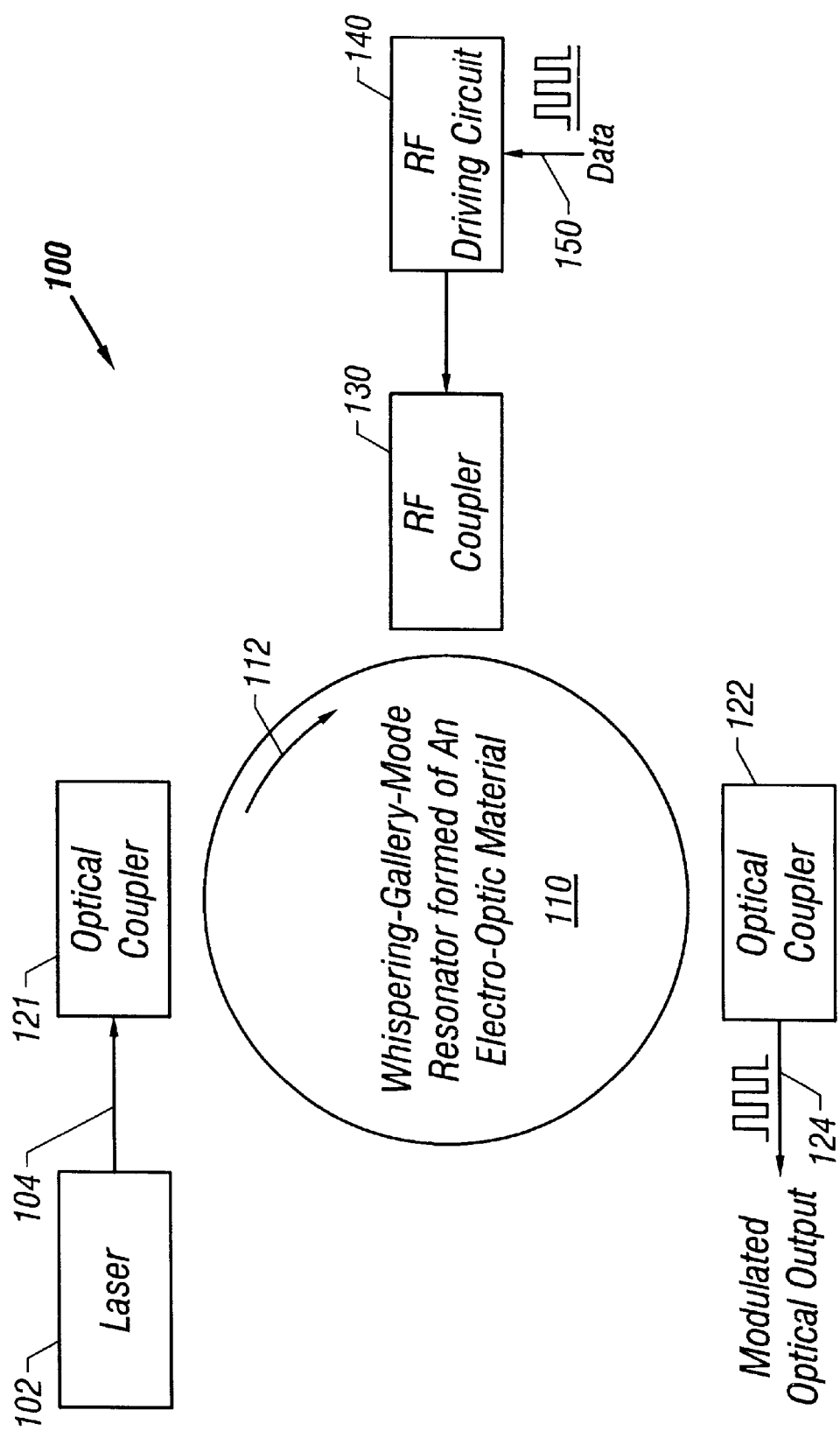
FIG. 1 shows one embodiment of an optical modulator based on a whispering-gallery-mode resonator made of an electro-optic material.

An optical resonator uses an optical feedback mechanism to store optical energy only in certain resonator modes. An optical wave in a supported resonator mode circulates in the resonator. When the recirculating optical wave has a phase delay of $N2\pi$ ($N=1, 2, 3, \ldots$), the optical resonator operates in resonance and optical energy accumulates inside the resonator and can be transmitted through the resonator with a minimum loss. If the optical is coupled out at this resonance condition, the output of the resonator is maximized. However, when the recirculating wave in the resonator has a phase delay other then $N2\pi$, the amount of optical energy accumulated in the resonator is reduced and, accordingly, the coupled output is also reduced from its maximum value.

If the phase delay in the optical cavity can be modulated, a modulation on the output from an optical resonator can be achieved. The modulation on the phase delay of recirculating wave in the cavity is equivalent to a shift between a resonance condition and a non-resonance condition and can be between any two different values in the phase delay. In fact, the initial value of phase delay (i.e. detuning from resonance) may be biased at a value where a change in. the phase delay produces the maximum change in the output energy.

The present disclosure includes a use of the above modulation mechanism in a whispering-gallery-mode resonator to modulate light. The phase delay of the optical feedback (i.e. positions of optical cavity resonances) is changed by changing the components of refractive index of the resonator via electro-optic modulation. An external electrical signal is used to modulate the optical phase in the resonator to shift the whispering-gallery mode condition and hence the output coupling. Such an optical modulator can operate at a low operating voltage, in the millivolt range. This can achieve a high modulation speed at tens of gigahertz or higher, and have a compact package. The optical coupling with the resonator may be implemented with waveguides or fibers for integration with other fiber optical elements or integrated electro-optical circuits formed on substrates. Hence, such optical modulators may be used in a variety of applications having optical modulation, including optical communication and optical signal processing.

A whispering-gallery-mode resonator may be formed from a transparent sphere made of a dielectric material. Other geometries based on a sphere are also possible, including a disk cavity or a ring cavity. Optical energy can be coupled into a resonator by evanescent coupling, e.g., using an optical coupler near the sphere by less than one wavelength of the optical radiation. Such resonators have a special set of resonator modes known as "whispering gallery modes". These modes represent fields confined in an interior region close to the surface of the sphere around its equator due to the internal reflection of the radiation. Microspheres with 10 micron or larger diameter have a resonator dimension much larger than the wavelength of light. Thus the loss due to the finite curvature of the resonator may be negligible.

The resonators may be designed to have a high quality factor, Q, that are only limited with attenuation of radiation in the dielectric material and the surface imhomogeneities. Some microspheres have been shown to have very high quality factors for light waves, exceeding $10^9$ for quartz microspheres. See, e.g., Braginsky V. B., Gorodetsky M. L., Ilchenko V. S, Phys. Lett., Vol. 137, p.393(1989) and Collot et al., Europhys. Lett., Vol. 23, p.327(1993).

Such high Q values may allow concentration of strong fields in the whispering gallery modes. High-Q microsphere resonators have been used in a number of devices, including narrow band filters, lasers, laser stabilizers, and quantum nondemolition energy measurement devices. The use of droplet microcavities has also been recently made to demonstrate enhanced gain in such nonlinear optical processes as Raman and Rayleigh-wing scattering, as well as in four-wave parametric oscillation. Here the use of dielectric microspheres of materials with an electro-optic effect for the modulation of optical radiation is proposed.

For a given whispering-gallery-mode sphere, the resonator modes and quality factor, Q, at a particular wavelength of radiation may be found by solving the following equations for the $TM_{n,m,q}(z)$ modes:

$$\frac{n}{z} - \frac{J_{n-1/2}(z)}{J_{n+1/2}(z)} - \frac{n\epsilon}{z} + \sqrt{\epsilon}\frac{H^{(2)}_{n-1/2}\left(\frac{z}{\sqrt{\epsilon}}\right)}{H^{(2)}_{n+1/2}(\sqrt{\epsilon})} = 0, \quad (1)$$

where n is the mode index, z=x−iy, Q=x/2y, ∈ is the dielectric constant of the sphere, and $J_{n\mp\frac{1}{2}}(z)$ and $H_{n\mp\frac{1}{2}}(z)$ are respectively the Bessel and Hankel functions. See, e.g., an example description in Lin and Campillo, Phys. Rev. Lett., Vol. 73, p.2440 (1994). Similarly, the equation for the $TE_{n,m,q}(z)$ modes is:

$$\frac{J_{n=1/2}(z)}{J_{n+1/2}(z)} - \frac{1}{\sqrt{\epsilon}}\frac{H^{(2)}_{n-1/2}\left(\frac{z}{\sqrt{\epsilon}}\right)}{H^{(2)}_{n+1/2}\left(\frac{2}{\sqrt{\epsilon}}\right)} = 0, \quad (2)$$

These equations may be solved numerically to find the appropriate modes for supporting the optical waves.

Under proper configurations, either the sphere resonator alone or the sphere resonator in connection with a proper electrical strip line can form an electrical resonator to support electrical energy in the same whispering gallery modes with proper phase matching conditions. Hence, electrical and optical waves can coexist and co-propagate in certain whispering gallery modes. When the sphere is formed of an electro-optic material, the electrical wave can be used to alter or modulate the dielectric constant of the sphere and hence modulate the light based on the electro-optic effects.

One consequence of Equations (1) and (2) is that for certain values of the dielectric constant ∈ and the sphere radius R, whispering gallery modes with very high Q exist, for a given wave with wavelength λ. For example, in quartz spheres of diameter on the order of 100 microns, modes with Q's in the range of $10^8$ and higher may be excited. These whispering gallery modes may propagate very close to the surface of the resonator, typically in a thickness less than 10 microns. High Q values can also be achieved for waves in the mm and microwave regions of the electromagnetic spectrum. Fore example, a Q value about $10^9$ has been observed with sapphire resonators at cryogenic temperatures.

FIG. 1 shows an optical modulator 100 with a whispering-gallery-mode resonator 110 according to one embodiment of the disclosure. Two optical couplers 121 and 122 are placed close to the resonator 110 as optical input coupler and output coupler, respectively. An input optical beam 104, e.g., a laser beam from a laser 102, is coupled into the resonator 110 as the internally-circulating optical wave 112 in the whispering gallery modes by the coupler 121. The coupling may be achieved through the evanescent coupling so that the couplers 121 and 122 are placed close to the resonator 110 by a spacing less than one wavelength of the beam 104. In evanescent coupling, the evanescent fields at the surface of the sphere decays exponentially outside the sphere. Once coupled into the resonator, the light undergoes total internal reflections at the surface of the sphere. The effective optical path length is increased by such circulation. The output coupler 122 couples a portion of the circulating optical energy in the resonator 110, also through the evanescent coupling, to produce an output beam 124.

Alternatively, the optical coupling may be implemented by using angle-polished fibers or waveguides 391 and 392 as shown in FIG. 3A. The angle-polished tip is placed near the resonator 310 to effectuate the evanescent coupling. The index of refraction of the fibers or waveguides 391 and 392 has to be greater than that of the resonator 310, and the optimal angle of the polish has to be chosen depending on the ratio of indices (V. S. Ilchenko, X. S. Yao, L. Maleki, Opt. Lett, Vol. 24, 723 (1999).

An electrical coupler 130 is also disposed near the resonator 110 to couple an electrical wave which causes a change in the dielectric constant ∈ due to the electro-optic effects. An electronic driving circuit 140 is coupled to supply the electrical wave to the electrical coupler 130. A control signal 150 can be fed into the circuit 140 to modulate the electrical wave. This modulation is then transfered to a modulation in the optical output 124 of the resonator 110.

The resonator 110 may be formed from any electro-optic material such as lithium niobate "or a similar electro-optic crystal". The whispering gallery modes essentially exist near the equator of the sphere, the resonator 110 may be not a whole sphere but a portion of the sphere near the equator that is sufficiently large to support the whispering gallery modes. Hence, rings, disks and other geometries formed from spheres may be used.

FIG. 2A shows a disk-like whispering gallery mode resonator. It is formed from a sphere by removing top and bottom portions of the sphere to leave a portion containing the sphere equator 200. This embodiment of the resonator 110 includes a top circular surface 210 and a bottom circular surface 220, both with diameters less than the diameter of the original sphere. The side surface 230 may be a spherical surface. The spacing, d, between the top and bottom surfaces 210 and 220 is sufficiently large that the optical and electrical modes centered at the equator 200 remain essentially undisturbed by the geometry. A small spacing d can be used to achieve a sufficient electrical field strength for the electro-optic modulation at a low voltage, e.g., on the order of millivolts.

In general, the optic axis of the electro-optic material for the resonator 110 may be in any direction. FIG. 2B shows a disk configuration where the optic axis c (202) is different from the axis z (201) perpendicular to the equatorial circular plane. In certain applications, the optic axis c (202) may be aligned with the axis z (201) as in FIG. 2A.

The optical modulator 100 in FIG. 1 may support rf (i.e. mm and microwave) signals, and light, simultaneously in a sphere of material with the electro-optic effect. Lithium niobate, for example, changes its real part of the index of refraction in response to the applied electric field. Other materials may respond to the electric field differently. Multiple quantum well structures of III–V compounds, for example, change their imaginary part of the index of refraction when the electric field is applied.

A resonator formed from a lithium niobate sphere with a diameter on the order of 3 mm, whispering gallery modes with Q's larger than $10^7$ can be supported. Since lithium niobate has an $\in$ of about 50 in the rf range, the same sphere can support waves with mode index n=5 or larger. For these waves Q would be on the order of $10^4$. Now the applied electrical field can be arranged to change the speed of propagation of the optical field, which propagates in a thickness of only a few microns near the perimeter of the sphere around its equator. The rf mode field also occupies the same region, and owing to the relatively large Q of the mode, high electrical field values can be obtained at a small input RF power, to change the index of refraction by a significant amount.

Assume, as a first order approximation, that the relation between the radius R of the sphere, the mode index number n, and the wavelength of light λ is $$2\pi R \approx \frac{n\lambda}{\sqrt{\epsilon}}. \quad (3)$$

This relation suggests that the change in λ is approximately linear with the change in $\sqrt{\epsilon}$. Now the mode detuning by electro-optical effect required to transfer the energy from this mode to a different mode may be on the order of $Q^{-1}$ (for λ=1300 nm; Q=$10^7$). Thus, to change the energy out of this mode, a change in the index less than a part per million is required. This is at least two orders of magnitude smaller than the fields required in many traveling-wave electro-optic modulators.

Another approach for estimating the required half-wave voltage $V_\pi$ in comparing the microsphere to the traveling wave modulator is to consider the following. The electrical length of the microspherical resonator is on the order of few meters, compared to the centimeter long length of the traveling wave modulator, which requires a $V_\pi$ of a few volts. This implies that, for the microsphere, the interaction length is increased by a factor of about $10^2$ to about $10^3$. This reduces the needed $V_\pi$ by the same factor. This increased efficiency will also be further improved with the electric field applied in the whispering gallery mode to allow a Q multiplication (by a factor of $10^4$) of the energy density in the sphere. Even with the built-in inefficiency (on the order of 3 dB) associated with the coupling of the rf and light power, the modulator 100 shown in FIG. 1 can be orders of magnitude more efficient than those traveling wave modulators. In addition, in the case of materials with electro-absorption, where the electric field can best be applied directly, rather than in a whispering gallery mode, again many orders of magnitude in efficiency is expected.

The resonator 110 with a high Q factor has a number of other advantages. For example, the resonator 110 can effectuate an increase in the energy storage time for either the optical energy or the electrical energy and hence reduce the spectral linewidth and the phase noise of both. Also, the mode matching conditions make the optical modulator 100 also operate as a signal filter so that only certain input optical beam 104 can be coupled through the resonator 110 to produce a modulated output by rejecting other signals that fail the mode matching conditions.

FIG. 3 shows one implementation of a light modulator 300 in a modulator housing 380 based on the system 100 in FIG. 1. Optical fibers 332 and 334 are used to guide input and output optical beams. Microlenses 331 and 222, such as gradient index lenses, are used to couple optical beams in and out of the fibers. Two prisms 321 and 322 operate as the optical couplers to provide evanescent coupling with the whispering gallery mode resonator 310. Different from the system 100 which uses the resonator 110 alone to support the electrical modes, a RF microstrip line electrode 350 is combined with the resonator 310 to form a RF resonator to support the electrical modes. An input RF coupler 330 formed from a microstrip line is implemented to input the electrical energy into the RF resonator. A circuit board 360 is used to support the microstrip lines and other RF circuit elements for the modulator.

The modulator 300 also includes a second RF coupler 370, which may be formed from a microstrip line on the board 360, to produce a RF output. This signal can be used as a monitor for the operation of the modulator or as an electrical output for further processing or driving other components.

FIGS. 4, 5, and 6 show examples of the microstrip line electrode 350 when the resonator 310 is similar to the disk configuration shown in FIGS. 2A and 2B. In FIG. 4, the electrode 350 is formed on the top surface of the resonator 310 and the another electrode 410 is formed in contact with the bottom surface of the resonator 310. FIG. 5 shows a half-circuit microstrip line as the top electrode 350 on the rim of the top surface. FIG. 6 shows two pieces of circular microstrip lines 350A and 350B (solid lines) as the top electrode 350 and two pieces of circular microstrip lines 410A and 410B as bottom electrodes (dot liens with shades).

Figure 7:
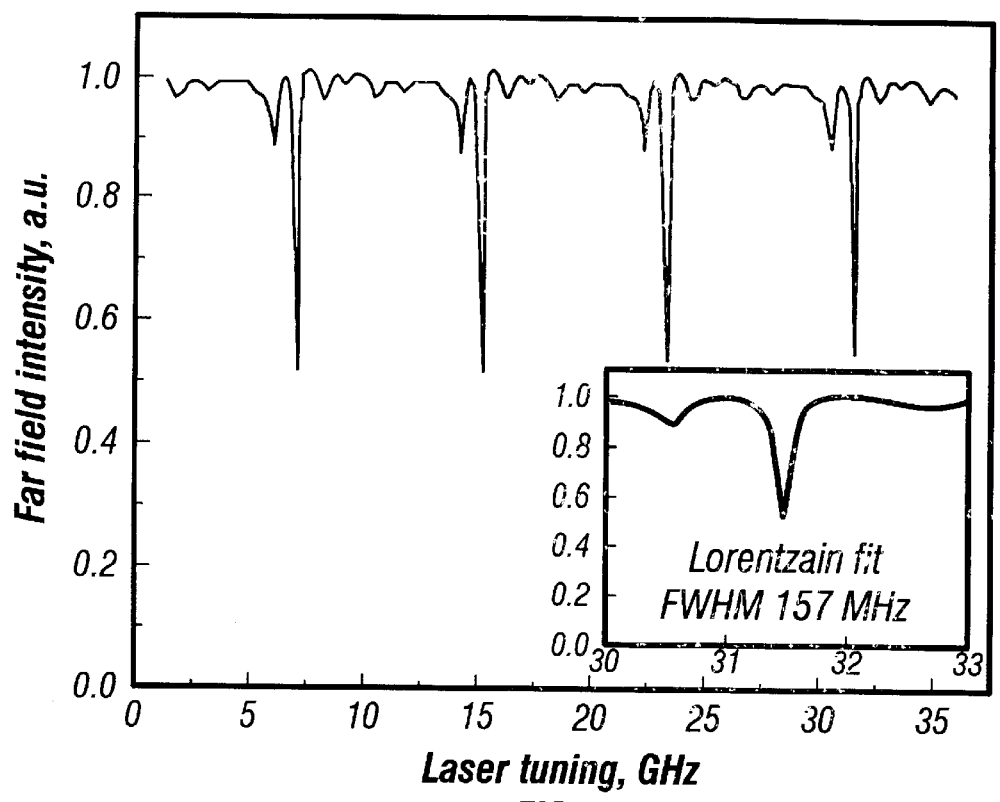
FIG. 7 shows the mode spectrum of a whispering-gallery-mode sphere resonator obtained by tuning the input laser frequency.
Figure 8:
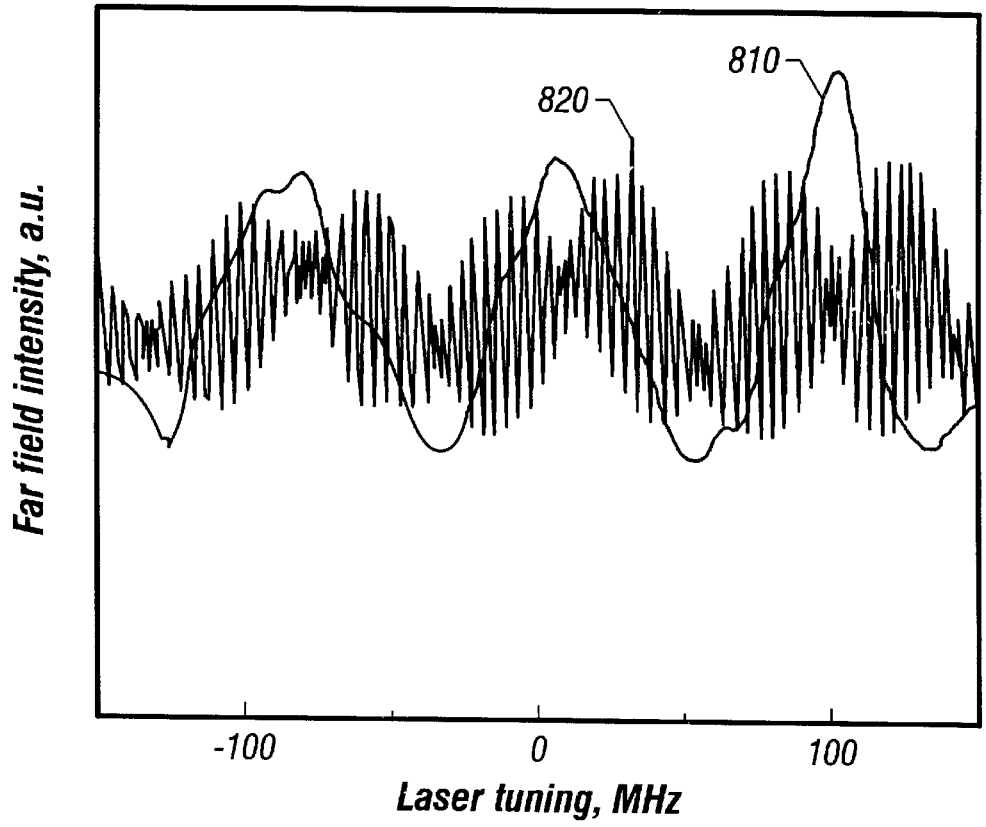
FIG. 8 illustrates the effect of applied RF field on the spectrum of optical whispering-gallery modes where intensity modulation is achieved at appropriately set input laser frequencies.

FIGS. 7 and 8 show measured data from the modulator 300 in FIG. 3 where the resonator 310 is a whole sphere. The electrodes are formed at the opposite poles of the sphere. A commercial-grade lithium niobate crystal (Casix Inc.) is used to form the disk-like resonator 310. The LiNbO3 crystal has a low optical absorption at about $\alpha \approx 0.02$ cm$^{-1}$, allowing the quality-factor Q=$2\pi n/(\alpha\lambda) \sim 10^7$ for the whispering-gallery modes. The resonator is custom fabricated and polished.

High-quality spheres are in general difficult to fabricate from crystalline materials via fusion as with amorphous materials. Upon fusion of crystalline materials, spontaneously forming boundaries between misoriented crystalline grains, or blocks, may create significant optical inhomogeneities through the bulk of the sphere and on the surface, thus increasing the scattering losses beyond the acceptable level. However, self-organized spheres of cubic (non-birefringent) crystalline material were reported. Because of their sub-grain few-micron size, they can be used to support WG modes of reasonable Q~$10^4$–$10^5$. To obtain high-surface quality spheres of birefringent crystalline materials, one method is to machine and polish them using conventional optical methods. On flat or low-curvature substrates, modern methods allow to obtain angstrom size residual inhomogeneities—compatible to the roughness of fire-polished silica and therefore allowing ultimate Q$\geq 10^9$. These methods, however, are generally not used or adapted for making very small radii of curvature. In one of the early works, WG modes with quality-factor of about $1 \times 10^8$ were observed in a 3.8-cm diameter mechanically for the Gravity Probe B experiment. In the meantime, with a given size of surface inhomogeneity, limitation of Q by scattering losses is in direct proportion to the sphere diameter.

The optical prism optical couplers 321 and 322 for the evanescent wave coupling may be miniature diamond prisms of refraction index of about 2.4 higher than that of the resonator material ($n_0$=2.220; $n_e$=2.146). A DFB laser at about 1550 nm is used to produce the optical beam and is frequency-scannable via current modulation. The spectral data in FIG. 7 suggests that the employed prism coupling technique has a coupling efficiency about 50% in the loaded regime. The observed free spectral range (FSR) of about 8.3 GHz corresponds to the sequence of successive principal mode numbers 1 for TE-type WG modes excited in the plane perpendicular to the crystal axis. The estimated loaded quality-factor of the modes is about $1.2 \times 10^6$.

The non-Lorentzian shape of the observed resonance dips in FIG. 7 indicates the presence of clusters of slightly non-degenerate modes. It is discovered that, the character of the observed spectrum appears to critically depend on the orientation of the crystal with respect to the normal direction of the equator plane. With the excitation off the perpendicular plane to the crystal axis, the observed spectrum became dense with a reduced linewidth. This increases the Q factor. This preliminary measurement confirms that inexpensive fabrication and polishing techniques can be used to achieve the Q factor in the spheres of crystalline lithium niobate that is close to the limits defined by the material attenuation.

FIG. 8 shows the measured optical output power (curve 820) as a function of the laser frequency detuning for the input beam to the resonator. Curve 810 represents the corresponding optical whispering modes of the resonator. The intensity modulation in the curve 820 demonstrates the low-frequency electro-optical intensity modulation by the lithium niobate sphere. During continuous monitoring of WG mode spectrum in the sphere by tuning the laser, a 100 kHz RF voltage with $V_{eff}$=40V (~125V peak-to-valley) is applied to the electrodes. This produces an amplitude modulation maximal near the slopes of individual cavity resonance peaks.

The above electro-optical modulator based on whispering-gallery-mode resonators generally has limited operating bandwidth, though operable to produce high modulation speeds, due to the resonance conditions and mode-matching requirement. Such modulators may be suitable for a number of applications where optical carrier is fixed, and the cavity spectrum can be trimmed to have optical modes at the carrier frequency and the modulation sidebands. With development of appropriate fabrication techniques and reduction of the sphere size (at least 100 fold reduction is possible without compromising the optical Q), this inconvenience will be compensated by two serious advantages over many other optical modulators. For example, the controlling voltage (analog of the half-wave voltage $V_\pi$) can be reduced into millivolt domain. In addition, tiny capacity of electro-optic microspheres can simplify application-of microwave fields, compared to both plane-wave bulk electro-optical modulators and integrated Mach-Zender interferometer modulators.

Although only a few embodiments are described, various modifications and enhancements may be made without departing from the following claims.

What is claimed is:

1. A method for modulating light, comprising:
   coupling an optical beam into a whispering gallery mode optical resonator to circulate in at least one whispering gallery mode supported by the resonator, wherein the optical resonator is made of an electro-optic material;
   coupling an electrical signal into the optical resonator. to circulate in the same optical path of the coupled optical beam so as to change a dielectric constant of the electro-optic material in the optical path of the optical beam within the optical resonator; and
   modulating the electrical signal to modulate an optical output coupled from the optical resonator.

2. The method as in claim 1, further comprising configuring the resonator so that modes of the electrical signal can be supported by the resonator alone.

3. The method as in claim 1, further comprising using at least two electrodes to form an electrical signal resonator that includes the optical resonator.

4. The method as in claim 1, wherein said optical resonator includes a whole sphere made of the electro-optic material.

5. The method as in claim 1, wherein said optical resonator includes a portion of a whole sphere, said portion including the equator of the whole sphere.

6. The method as in claim 1, further comprising coupling the optical beam and configuring the optical resonator so that the optic axis of the electro-optic material is substantially parallel to an axis perpendicular to a plane within which the optical beam is circulating within the optical resonator.

7. The method as in claim 1, further comprising coupling the optical beam and configuring the optical resonator so that the optic axis of the electro-optic material forms an angle with respect to an axis perpendicular to a plane within which the optical beam is circulating within the optical resonator.

8. The method as in claim 1, further comprising biasing said optical resonator so that the optical frequency of said input optical beam is at a position detuned from a resonance peak of one of the whispering gallery modes.

9. A device, comprising:
   an optical resonator to support whispering gallery modes and formed of an electro-optic material;
   an input optical coupler positioned to couple an input optical beam to circulate in said optical resonator in one whispering gallery mode;
   an output optical coupler positioned to couple optical energy in said optical resonator to produce an optical output; and
   an electrical coupler positioned to couple an electrical signal to co-propagate in an optical path of the circulating optical beam within said optical resonator to change a dielectric constant of said electro-optic material so as to modulate said optical output.

10. The device as in claim 9, wherein said optical resonator comprises at least a portion of a sphere, said portion having the equator of the sphere and sufficiently large to support the whispering gallery modes.

11. The device as in claim 10, wherein said optical resonator includes a first surface one side of the equator of the sphere and a second surface on an opposite side of the equator, further comprising:
   a first electrode formed on said first surface; and
   a second electrode formed on said second surface, wherein said first and said second electrodes and said optical resonator form an electrical signal resonator.

12. The device as in claim 11, wherein said first electrode includes a circular strip line.

13. The device as in claim 12, wherein said first electrode includes another circular strip line.

14. The device as in claim 10, wherein the electro-optic material has an optic axis that is substantially perpendicular to the equator of the sphere.

15. The device as in claim 10, wherein the electro-optic material has an optic axis that forms an angle with an axis substantially perpendicular to the equator of the sphere.

16. The device as in claim 9, wherein said electro-optic material includes an electrooptic crystal.

17. The device as in claim 9, wherein said electro-optic material includes a multiple quantum well structure.

18. The device as in claim 9, wherein at least one of said first and said second optical couplers includes a prism with an index of refraction greater than an index of refraction of said electro-optic material.

19. The device as in claim 9, wherein at least one of said first and said second optical couplers includes an angle-polished waveguide or fiber.

20. A method, comprising:

coupling both an electrical signal and an optical signal into a whispering gallery mode of an optical resonator to co-propagate along the same signal path within the optical resonator which is formed of an electro-optic material;

modulating the electrical signal to modulate an index of refraction experienced by the co-propagating optical signal to modulate the co-propagating optical signal.

21. The method as in claim 20, further comprising using the optical resonator alone to support the coupled electrical signal in the whispering gallery mode.

22. The method as in claim 20, further comprising using at least one electrode formed on or adjacent to the optical resonator to support the coupled electrical signal in the whispering gallery mode.

23. The method as in claim 20, wherein the optical resonator includes at least a portion of a sphere near an equator of the sphere sufficiently large to support the whispering gallery mode.

24. A device, comprising:

an optical resonator configured to support whispering gallery modes and formed of an electro-optic material;

an input optical coupler positioned to evanescently couple an input optical beam into a whispering gallery mode of said optical resonator;

an output optical coupler positioned to evanescently couple optical energy in said whispering gallery mode out said optical resonator to produce an optical output; and an electrical coupler positioned to couple a modulated electrical signal into said optical resonator to be in said whispering gallery mode to co-propagate with said optical energy within said optical resonator to change a dielectric constant of said electro-optic material so as to modulate said optical output.

25. The device as in claim 24, wherein said optical resonator is a microsphere.

26. The device as in claim 24, wherein said optical resonator includes at least a portion of a sphere near an equator of the sphere sufficiently large to support said whispering gallery mode.

27. The device as in claim 24, further comprising a electrical element coupled to said electrical coupler and located on or adjacent to said optical resonator to support said modulated electrical signal in said whispering gallery mode.

28. The device as in claim 16, wherein said electrooptic crystal includes lithium niobate.

* * * * *